United States Patent Office 2,711,385
Patented June 21, 1955

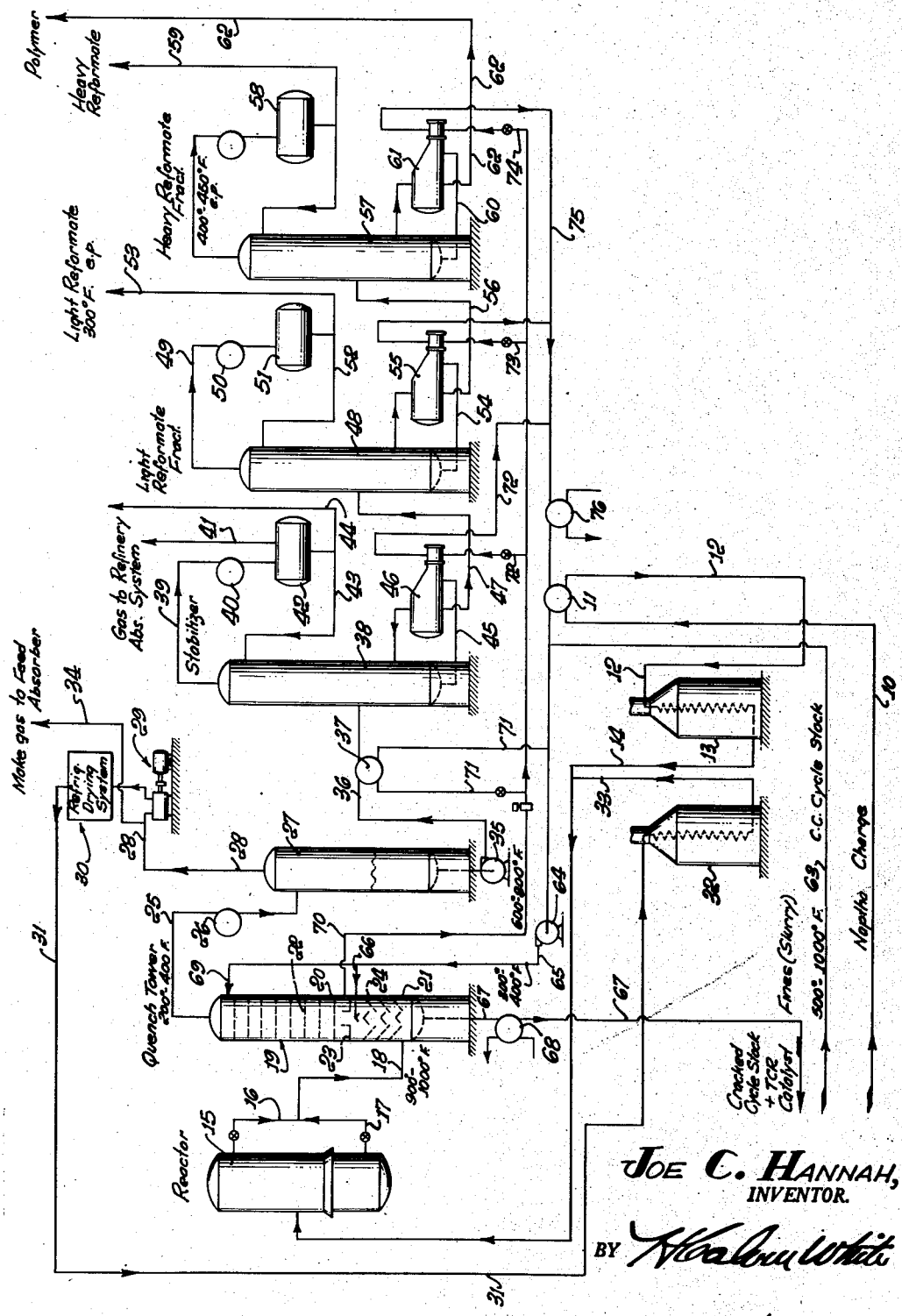

2,711,385

CATALYTIC REFORMING HEAT RECOVERY AND PRODUCT SEPARATION

Joe C. Hannah, Anaheim, Calif., assignor to The Fluor Corporation, Ltd., Los Angeles, Calif., a corporation of California Application September 29, 1952, Serial No. 312,088

9 Claims. (Cl. 196—50)

This invention has to do generally with improvements in the processing of hydrocarbons by catalytic reforming methods, and has for its general objects to economically recover a large amount of the heat present in the effluent from a catalytic reforming reactor, to accomplish efficient removal of catalyst fines from the reactor effluent stream, and to minimize the pressure drop in the recycle gas stream.

The invention is adaptable to refining systems employing, generally considered, a catalyst-containing reactor to which the charging stock, typically naphtha, is fed after being heated to cracking temperature. After leaving the reactor, the hydrocarbon stream enters a quenching zone in essentially vapor phase, and the vapors then pass through successive separating or fractionating stages for the recovery of gaseous and various liquid fractions. This general type of plant imposes the requirements (1) of the removal in the quench zone of catalyst carry-over from the reactor, and (2) of supplying heat to the liquid hydrocarbon stream undergoing fractionation or separation of lower boiling constituents.

One of my major purposes is to employ a common medium for the removal of catalyst from the system beyond the reactor, and for effecting important heat economies by utilizing heat removed from the high temperature reactor effluent, for heating at later stages the liquid hydrocarbon stream for and in the course of its fractionation. In accomplishing these purposes, I utilize in the system an extraneous high boiling and preferably aromatic oil stock (such as the recycle oil from a catalytic cracking unit) as a heat carrier stock to be maintained in continuous circulation between the quench zone and one or more heat exchangers in the separation and fractionation stages. A major portion of this circulated stock serves as a quenching medium for the heat reactor effluent vapors and as a medium for transferring the heat so acquired, to the subsequent liquid hydrocarbon heating stages. A smaller and side stream portion of the circulated stock is contacted separately with the reactor effluent, as a scrubbing medium for entrainment and removal of catalyst fines from the system. By using only a minor portion, say under 20%, of the circulated stock as the scrubbing medium, the remainder of the stock is left available for recovery of the bulk of the sensible heat content of the vapors. Using as the circulation stock the proper quantity of an oil having a boiling range beyond the boiling range of the reactor effluent constituent, little vaporization of the oil and little condensation of the reactor effluent vapors occur in the quench zone.

All the various features and objects of the invention as well as the details of a typical system for carrying out its methods will be understood more fully from the following description of the accompanying flow sheet embodiment.

The charging stock may consist of a naphtha fraction within the boiling range of about 100 to 450° F., introduced to the system through line 10 and passed through exchanger 11 and line 12 to an appropriate heater 13 wherein the charging stock is heated to a temperature in the neighborhood of about 900 to 1050° F. From the heater the charging stock stream passes through line 14 to a reactor 15 which may be of any suitable type containing a body of granular solid catalyst of the kind commonly employed for reforming a naphtha stock heated within the indicated range. As illustrated, the reactor may be of the "T. C. R." type employing catalyst beads as the catalyst, and within which the naphtha undergoes reformation at a pressure of about 175 p. s. i. g. The hydrocarbon stream leaves the reactor through lines 16 and 17 and passes through line 18 to a quench tower 19, into which the hydrocarbons enter in essentially vapor phase and at a temperature of about 900 to 1000° F.

The quench tower 19 contains upper and lower sections 20 and 21, the former of which may contain a series of trays 22 above the chimney or draw-off tray 23. The lower section 21 may contain any suitable arrangement of baffles 24 for effecting intimate contact between the vapors rising through the tower from line 18, and the later described portion of the higher boiling cycle stock being circulated to the quench tower.

Leaving the quench tower at a temperature of say 200 to 400° F., the vapors flow through line 25 and a partial condenser 26 to a separator 27 from which the gases and vapors are taken through line 28 to a centrifugal compressor 29 which charges the gas back to the reactor 15 through the diagrammatically indicated refrigeration drying system 30, line 31, heater 32 and line 33 leading from the heater to the reactor. A portion of the gas and vapor stream in line 28 may be taken through line 34 to an absorption system.

Liquid recovered in the base of the separator 27 is taken by pump 35 and is charged by line 36 through exchanger 37 to a stabilizer column 38 for the removal through line 39 of light ends, the vapor stream passing through a partial condenser 40 for removal through line 41, as to a refinery absorption system. A portion of the condensate (predominantly $C_3$–$C_4$ fractions) collecting in accumulator 42 is returned through line 43 as reflux to the stabilizer, with the remainder going to storage or other disposal through line 44. The stabilizer bottoms pass through line 45 through a conventional reboiler 46 and thence through line 47 to the light reformate fractionating column 48. At this point it may be mentioned that the stabilizer 38 as well as the subsequent fractionating columns, all may be regarded as fractionating stages in the system.

From the fractionating column 48, the vapors pass through line 49 and condenser 50 for recovery in accumulator 51, from which a portion of the condensate returns through line 52 to the column as reflux, with the balance being taken through line 53 as a light reformate distillate having for example an end point of around 300° F.

From column 48 the bottoms are withdrawn from line 54, reboiler 55 and line 56 to the heavy reformate fractionating column 57 from which the overhead condensate recovered in accumulator 58 is recovered through line 59 as a heavy reformate fraction having an end point of for example in the 400 to 450° range. The bottoms from column 57 are removed through line 60, reboiler 61 and line 62 to storage as a relatively heavy polymer.

The invention is more primarily concerned with the utilization in a catalytic reforming system having the general characteristics described, of a relatively high boiling oil derived from an extraneous source, to serve the dual functions of catalyst fines separation from the reactor effluent, and utilization of important quantities of heat in the reactor effluent for the purposes of the subsequent fractionating stages. In accordance with the invention, a relatively high boiling oil, such as an aromatic stock falling typically within the 500 to 1000° F. boiling range, is introduced to the system through line 63 to be taken by pump 64 and discharged through line 65 at a temperature of say 300 to 400° F. to the quench tower 19. A minor portion of the cycle stock stream, say under about 20%, is discharged through line 66 into the lower section 21 of the quench tower to be intimately admixed with the rising vapors so that the oil in effect acts as a scrubbing medium to entrain and remove the catalyst fines carried over from the reactor. The resulting slurry is withdrawn through line 67 and cooler 68 for disposal. A second and major portion of the cycle stock flows through line 69 into the upper section 20 of the quench tower for passage downwardly through the trays 22 in direct heat transferring relation with the reactor effluent vapors. The heated cycle stock is withdrawn from section 20 through line 70 at a temperature within about the 600 to 800° F. range for passage through line 71 as the heating medium in exchanger 37, and through lines 72, 73 and 74 as the heating medium for the reboilers 46, 55 and 61. Lines 71 to 74 connect with a common return line 75 through which the stock may be recirculated through a steam generator 76, if desired, and thence through exchanger 11 back to the pump 64.

I claim:

1. The method that includes heating a stream of relatively low boiling hydrocarbons and passing the stream through a reactor zone containing a solid particle catalyst, introducing the hydrocarbons and entrained catalyst particles from the reactor zone into and upwardly within a vertically extended quench zone, passing the vapors from the quench zone through a fractionating zone from which vapors and unvaporized hydrocarbons are separately removed, continuously circulating a stream of high boiling cycle stock hydrocarbons derived from an extraneous source through said quench zone in intimate contact with the vapors therein and thence through a heat exchange zone in indirect heat transfer relation with unvaporized hydrocarbons from said fractionating zone, and removing from said quench zone a side stream of the cycle stock carrying catalyst particles separated from the vapors.

2. The method as defined in claim 1, in which said low boiling hydrocarbons are a naphtha stock having a boiling range within about 100 to 450° F. and said cycle stock is of essentially aromatic composition having a boiling range within about 500 to 1000° F.

3. The method as defined in claim 1, in which the quench zone includes upper and lower sections through the upper of which one portion of the cycle stock is circulated, another portion of the cycle stock being passed through the lower section to entrain and remove the catalyst.

4. The method that includes, heating a stream of relatively low boiling hydrocarbons and passing the stream through a reactor zone containing a solid particle catalyst, introducing the hydrocarbons and entrained catalyst particles from the reactor zone into and upwardly within a vertically extended quench zone, passing the vapors from the quench zone through successive fractionating zones from which vapors are removed and between which an unvaporized hydrocarbon stream is passed from one into the next of the fractionating zones, continuously circulating a stream of high boiling cycle stock hydrocarbons derived from an extraneous source through said quench zone in intimate contact with the vapors therein and thence through a heat exchange zone in indirect heat exchange relation with said unvaporized hydrocarbon stream, and removing from said quench zone a side stream of the cycle stock carrying catalyst particles separated from the vapors.

5. The method as defined in claim 4, in which there are employed at least two heat exchange zones between at least three fractionating zones.

6. The method as defined in claim 4, in which said low boiling hydrocarbons are a naphtha stock having a boiling range below the boiling range of the cycle stock.

7. The method as defined in claim 4, in which said low boiling hydrocarbons are a naphtha stock having a boiling range within about 100 to 450° F., and said cycle stock is of essentially aromatic composition having a boiling range within about 500 to 1000° F.

8. The method as defined in claim 4, in which the quench zone includes upper and lower sections through the upper of which one portion of the cycle stock is circulated, another portion of the cycle stock being passed through the lower section to entrain and remove the catalyst.

9. The method as defined in claim 1, in which the quench zone includes a first section through which a minor portion of the cycle stock is passed to entrain and remove the catalyst, and a second section through which a major portion of the cycle stock is passed.

References Cited in the file of this patent

UNITED STATES PATENTS

| | | |
|---|---|---|
| 2,356,697 | Rial | Aug. 22, 1944 |
| 2,357,332 | Kelly et al. | Sept. 5, 1944 |
| 2,405,395 | Bahlke et al. | Aug. 6, 1946 |
| 2,408,948 | Ocon et al. | Oct. 8, 1946 |
| 2,439,730 | Happel | Apr. 13, 1948 |